April 2, 1929.  S. T. MORELAND  1,707,408
SHEARING DEVICE
Filed Feb. 13, 1928  2 Sheets-Sheet 1
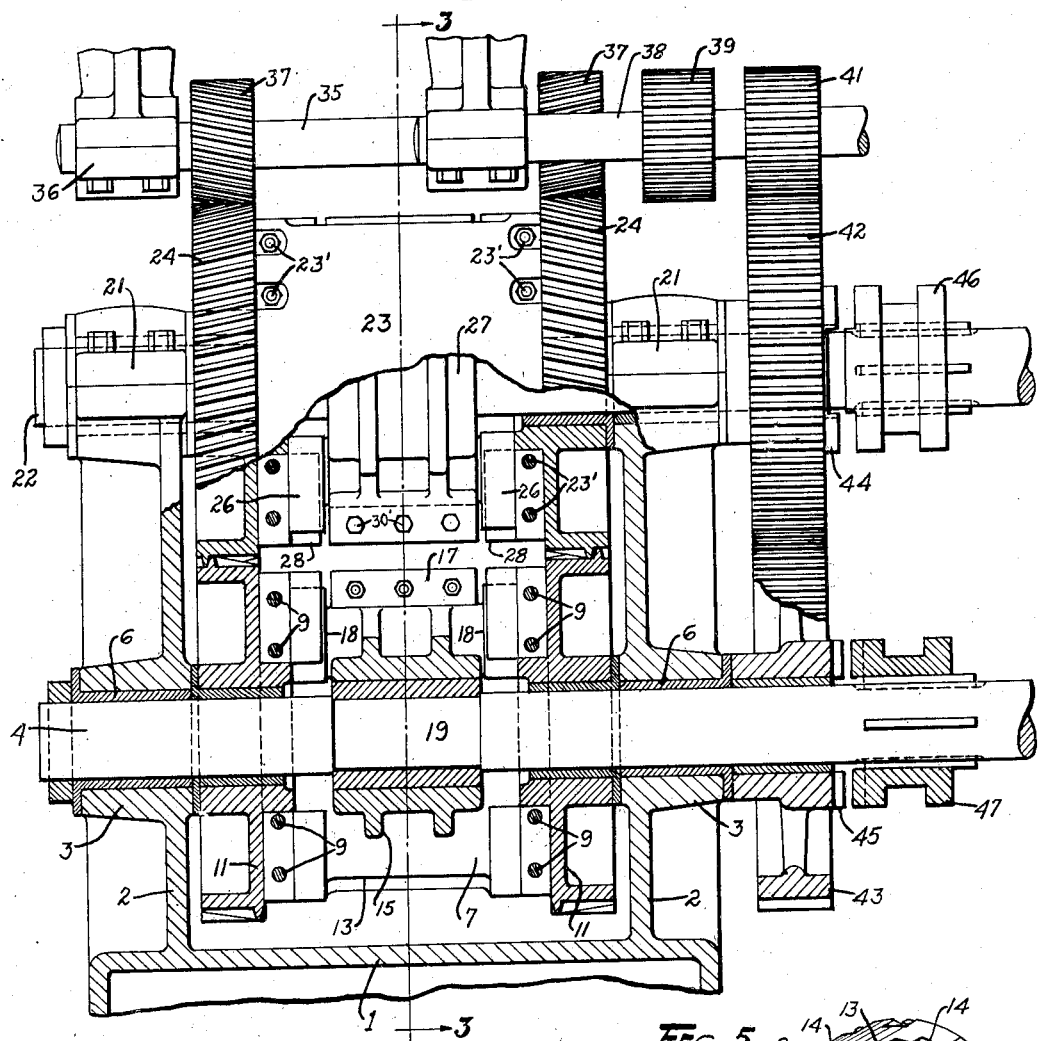
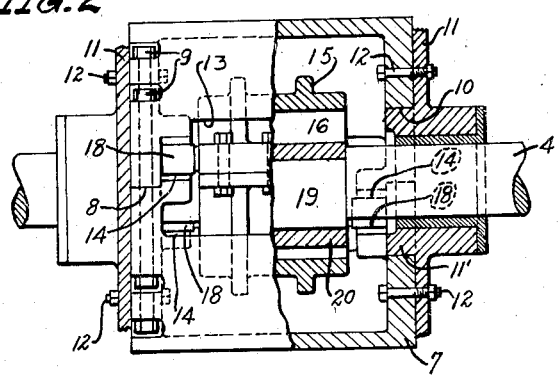
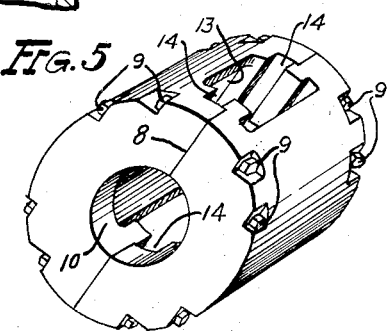
INVENTOR
S. T. MORELAND
BY
ATTORNEY April 2, 1929.　　　S. T. MORELAND　　　1,707,408
SHEARING DEVICE
Filed Feb. 13, 1928　　　2 Sheets-Sheet 2
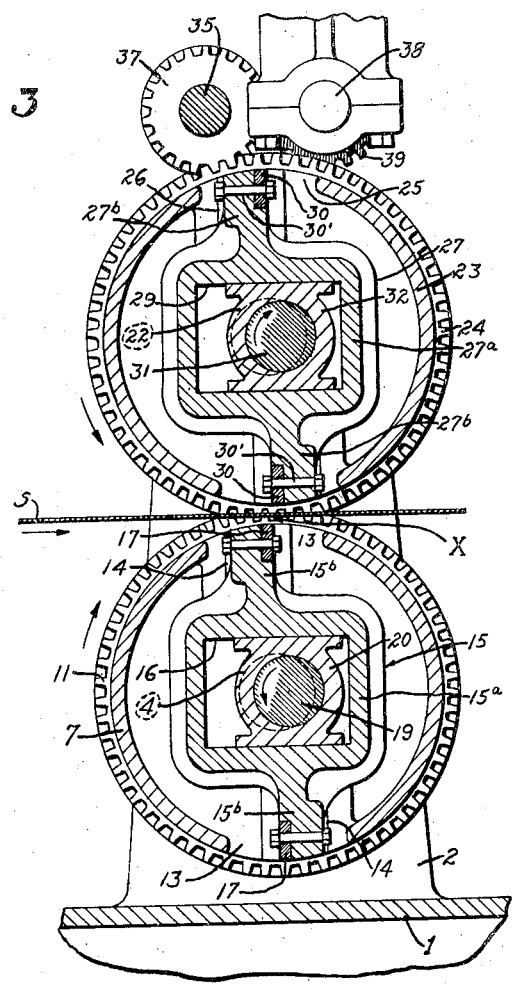
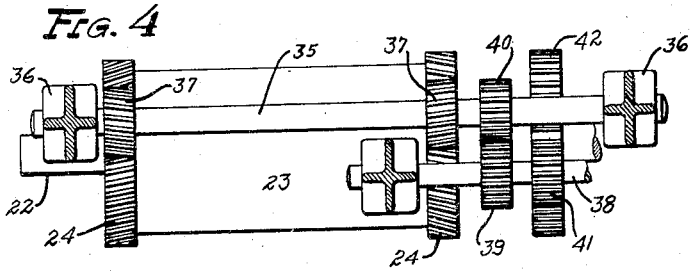
INVENTOR
S. T. MORELAND
BY J.S. Cook
ATTORNEY Patented Apr. 2, 1929.

1,707,408

UNITED STATES PATENT OFFICE.

STEPHEN T. MORELAND, OF ALTON, ILLINOIS.

SHEARING DEVICE.

Application filed February 13, 1928. Serial No. 253,994.

This invention relates generally to shearing devices particularly of the type employed for cutting sheet strip or bar metal, and more specifically to a shearing device of the rotary type adapted to cut sheets, strips or bars of metal without interrupting the forward movement thereof, the predominant object of the invention being to produce a shearing device of the type mentioned, which is of unique and relatively simple construction, and of such design as to withstand the severe usage to which such devices are subjected.

Another important object of the invention is to construct a shearing device of this type which will require relatively little power in the operation thereof.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. 1 is a view, partly in vertical section and partly in elevation, showing the improved shearing device in association with the gearing for operating same, a part of the base, parts of the upper bearings and parts of the shafts being broken away to conserve space.

Fig. 2 is a view partly in vertical section and partly in elevation showing one of the drums of the device.

Fig. 3 is a cross-section on line 3—3 of Fig 1.

Fig. 4 is a plan view illustrating the gearing for operating the device, the hangers for the upper bearings being shown in section.

Fig. 5 is a perspective of one of the drums of the shearing device.

Referring to the particular embodiment of the invention illustrated in the drawings, 1 designates the base of the device, from which a pair of oppositely disposed supports 2 are extended in an upward direction. The supports 2 are provided with horizontally alined bearings 3 at points intermediate the lower and upper ends thereof, and mounted for rotation in said alined bearings is a shaft 4. The bearings 3 are preferably bushed with suitable bearing material, as shown at 6.

Loosely mounted on the shaft 4, intermediate of the supports 2, is a drum 7, said drum being comprised of a pair of drum sections secured together to produce a unitary structure. Each of the drum sections of which the drum 7 is composed comprises approximately one-half of the drum, and the meeting edges of the wall portions of said drum sections as defined by the line 8 extend longitudinally of the circumferential wall and transversely of the end walls at the approximate center of the drum. 9 designates bolts or other suitable fastening devices, by means of which said drum sections are secured together. The opposite end walls of the drum 7 are provided with apertures 10, which are of considerably greater diameter than the shaft 4, as shown in Fig. 2 at the right-hand end thereof, and said shaft is extended through said apertures.

Located at the opposite ends of the drum 7 is a pair of gears 11, preferably helical gears, which are loosely mounted on the shaft 4 so that they may rotate with respect thereto, and each of said gears is provided with an inwardly extended hub portion 11' (Fig. 2) which extends into the aperture 10 formed in the adjacent end wall of the drum 7. The gears 10 are secured to the end walls of the drum 7 by suitable fastening means, such as the bolts 12 shown in Fig. 2, whereby said gears and said drum will rotate as a unit. The gears 11 are provided with outwardly extended hub portions in addition to the inwardly extended hub portions referred to, and the openings through said gears through which the shaft 4 passes are preferably provided with suitable bushings.

The circumferential wall of the drum 7 is provided with a pair of oppositely disposed openings 13, each of which is located on the longitudinally extended meeting edges of the drum sections; that is to say, each opening 13 is formed partly in the circumferential wall of one drum section and partly in the circumferential wall of the associated drum section, as shown in Fig. 5. Extended inwardly from the circumferential wall of the drum 7, at the opposite ends of the openings 13, are guideways 14, there being a pair of oppositely disposed guideways associated with each opening 13, and the guideways associated with one opening 13 being offset in a direction transversely of the drum with respect to the guideways associated with the opening 13 at the opposite side of the drum (Fig. 3).

Arranged within the drum 7 is a reciprocatory element 15 comprising an intermediate portion 15ª and outwardly extended portions 15ᵇ, the intermediate portion 15ª being provided with a rectangular opening 16 formed therein, which is intended for a purpose to be hereinafter set forth. The outwardly extended portions 15ᵇ are each provided with an extreme outer end portion of increased thickness, and fixed to each of said portions of increased thickness is a shearing element 17. As shown clearly in Fig. 3, the outer side faces of the shearing elements 17 associated with the drum 7 are coincident with a line drawn diametrically through the center of the drum.

By referring now to Figs. 1 and 2, it will be noted that the reciprocatory member 15 is provided with pairs of guides 18, which extend outwardly from the opposite ends thereof in a direction parallel with the major axis of the drum, one pair of guides 18 being alined with each other longitudinally of the drum at one side of the shaft 4 and the other pair of guides being alined with each other longitudinally of the drum at the opposite side of said shaft 4. The guides 18 on the reciprocatory member 15 are extended into the guideways 14 formed within the drum 7, and it is obvious, in view of this arrangement, that said member 15 will be capable of guided reciprocatory movement in a direction at approximate right angles with respect to the major axis of said drum 7.

The portion of the shaft 4 which extends through the opening 16 formed in the intermediate portion of the reciprocatory member 15 is offset transversely of the shaft to provide said shaft with an eccentric 19 (Fig. 3), and 20 designates a head having an opening formed therethrough through which said eccentric portion of the shaft passes. The head 20 is mounted within the opening 16 formed in the intermediate portion 15ª of the reciprocatory member 15, and said head is arranged for sliding movement within said member 15.

Located at the upper ends of the supports 2 are alined bearings 21, in which a shaft 22 is mounted for axial rotation. The shaft 22 supports a drum 23, which is loosely mounted thereon and is constructed as is the drum 7 already described; that is to say, said drum 23 is comprised of a pair of drum sections secured together by means of bolts 23'. In like manner, the drum 23 has secured to it at its opposite ends a pair of gears 24, preferably helical gears, which are loosely mounted on the shaft 22 and are arranged in mesh with the gears 11 associated with the drum 7, and the circumferential wall of said drum is provided with oppositely disposed openings 25. Also, the drum 23 is provided with pairs of guideways 26 located at the opposite ends of the openings 25, said guideways being arranged with respect to the drum and relative to each other, as are the guideways 14 of the drum 7. A reciprocatory member 27 is arranged within the drum 23, said member being provided with outwardly extended guides 28 which extend into the guideways 26 formed in said drum and being capable, in view of this arrangement, of reciprocating at an approximate right angle with respect to the major axis of the drum. The reciprocatory member 27 comprises an intermediate portion 27ª having a rectangular opening or guideway 29 formed therein and outwardly extended portions 27ᵇ to which shearing elements 30 are fixed by bolts 30'.

The portion of the shaft 22 which extends through the opening 29 formed in the intermediate portion 27ª of the reciprocatory member 27 is offset transversely with respect to the axis of said shaft to provide an eccentric 31, and 32 designates a head having an opening formed therethrough, through which said eccentric portion of the shaft passes. The head 32 is mounted within the rectangular opening or guideway 29 formed in the intermediate portion 27ª of the reciprocatory member 27, and said head is arranged for sliding movement within said member 27. By referring to Fig. 3 it will be noted that the outer side faces of the shearing elements 30 associated with reciprocatory member 27 are coincident with a line drawn diametrically through the center of the drum 23.

Arranged above the upper drum 23 and slightly offset transversely with respect to the shaft 22 is a shaft 35, which is mounted for rotation in suitable bearings 36 and has a pair of pinions 37 fixedly mounted thereon, which pinions mesh with the gears 24 located at the opposite ends of said drum 23, whereby both of the drums may be rotated. 38 designates a drive shaft, which is mounted for rotation in suitable bearings and is suitably connected to a source of energy, said shaft having a pinion 39 fixed to it which meshes with a similar pinion 40 fixed to the shaft 35 (Fig. 4). The drive shaft 38 has a second pinion 41 fixed to it, and this pinion meshes with a relatively large gear wheel 42 which is loosely mounted on the shaft 22 on which the upper drum 23 is mounted, said gear wheel 42 being in mesh with a similar gear wheel 43 loosely mounted on the shaft 4 on which the lower drum 7 is mounted.

The gear wheel 42 and the gear wheel 43 are provided at their hub portions with clutch portions 44 and 45, respectively, which rotate with said gear wheels, and 46 and 47 designate clutch members which are splined, or otherwise secured to the shafts 22 and 4, respectively, so that they will rotate with said shafts while being capable of moving longitudinally thereof. The clutch members 46 and 47 are connected to suitable mechanism, whereby said clutch members may be simultaneously moved into engagement with the clutch portions 44 and 45 on the gear wheels 42 and 43, and said mechanism includes means whereby said clutch members 46 and 47 will be withdrawn from engagement with said clutch portions 44 and 45 at the completion of one revolution of the shafts 22 and 4. As the clutch-operating mechanism referred to is very well known, and as it forms no part of the present invention, I have not illustrated it in the drawing, it being merely necessary to know in obtaining a clear understanding of the invention that the clutch members 46 and 47 are simultaneously moved into engagement with the clutch portions 44 and 45, and that such engagement is maintained during one complete revolution of the shafts 22 and 4.

In the operation of the improved shearing device disclosed herein, the sheet, strip or bar, of material S to be cut moves continuously in the direction indicated by the arrow in Fig. 3, and said sheet passes between the drums 7 and 23. The drums, which are rotated in the direction indicated by the arrows in Fig. 3, do not, however, function as the means for driving said sheet, as motion is imparted thereto by other means which are not shown in the drawings, and said sheet is supported by suitable rollers, which likewise are not shown in the drawings. The drums 4 and 23 are constantly rotated by the gearing already described herein, said drums and the reciprocatory elements 15 and 27 arranged therein rotating as units.

By referring to Fig. 3 of the drawings and noting particularly the portions of the eccentric portions of the shafts 4 and 22, it will be obvious that as the drums 7 and 23 are rotated the reciprocatory elements 15 and 27 will be projected horizontally and toward the right, as the drums reach positions where the outwardly extended arms 15$^b$ of said reciprocatory elements are approximately horizontal. This movement takes place because the shafts 4 and 22 are stationary at this time, and also because there is no opportunity, when the drums are in the positions suggested, for horizontal movement of the reciprocatory elements 15 and 27 in a direction to the left in Fig. 3, due to the fact that the guideways provided by the openings 16 and 29 in the heads 20 and 32 are at the moment disposed vertically. It is plain, therefore, that the extended, or high, portions of the eccentrics at the right of the shafts 4 and 22 in Fig. 3 will impart horizontal movement, through the walls of the heads 19 and 31, to the reciprocatory elements 15 and 27, thus projecting the shearing elements 17 and 30 carried by said reciprocatory elements 15 and 27 outwardly through adjacent openings 13 and 25 in the circumferential walls of the drums. It is plain, also, that as the drums 7 and 23 are rotated about centers, i. e., the centers of the shafts 4 and 22, which are offset from the centers of the eccentrics, there will be slight movement of the heads 20 and 32 within the guideways provided therefor by the openings 16 and 29 in the reciprocatory elements 15 and 27.

It being understood how the extended or high portions of the eccentrics will project the reciprocatory elements 15 and 27 horizontally when said eccentrics are positioned as shown in Fig. 3, it will be equally plain that, if said eccentrics were rotated to positions where the extended or high portion of the eccentric 19 were projected upwardly and the extended or high portion of the eccentric 31 were projected downwardly in Fig. 3, the reciprocatory elements 15 and 27 would be moved toward each other in a vertical direction, whereby shearing elements carried by said reciprocatory elements would cooperate with each other to shear material which may be positioned therebetween.

The shafts 4 and 22 rotate in directions opposite to those directions in which the drums 7 and 23 rotate, as indicated by the arrow in Fig. 3, this difference in direction being obtained through the operation of gearing already described, and with this in mind it will be assumed that the device is in operation and that a sheet of material S, which is to be cut, is passing between the drums. When the rotating shearing elements 17 and 30 reach the proper positions with respect to the shearing point, which shearing point is indicated by the reference character X in Fig. 3, the mechanism controlling the movement of the clutch members 46 and 47 will be actuated, thus moving said clutch members into engagement with the clutch portions 44 and 45. As a result of this engagement of the clutches, the shafts 4 and 22 will be rotated in the direction indicated by the arrows in Fig. 3, and the speed of rotation of the shafts is such with respect to the speed of rotation of the drum that the extended or high portions of the eccentrics will reach positions at the top and bottom of the shafts 4 and 23, respectively, just as the shearing elements are approaching the shearing point X. As the shearing elements reach the shearing point X, the extended or high portions of the eccentrics will project said shearing elements toward each other in a manner to cut the sheet, strip or bar S passing therebetween, and the shafts 4 and 22 will continue to rotate until they have each made one complete revolution, when the clutch-controlling mechanism will be operated to disengage the clutches and thus arrest the rotation of the shafts.

It is obvious from the foregoing that the sheet, strip or bar of material is cut without interfering in any way with its forward movement, and as the drums of the shearing device are constantly rotating, less power will be required to operate the device than was required to operate intermittently actuated shearing devices of the type formerly employed.

While I have shown in the drawings reciprocatory elements 15 and 27 provided each with oppositely disposed shearing elements, it is obvious that, if desired, each of said reciprocatory elements may be provided with only one shearing element.

I claim:

1. A shearing device comprising a plurality of rotary members between which the material to be cut is passed, reciprocatory members supported by said rotary members and movable with respect thereto, means for guiding said reciprocatory members, shearing elements fixed to said reciprocatory member and movable therewith, and means for moving said reciprocatory members with respect to said rotary members to move said shearing elements toward each other.

2. A shearing device comprising a plurality of rotary members between which the material to be cut is passed, reciprocatory members supported by said rotary members and movable with respect thereto, means for guiding said reciprocatory members, shearing elements fixed to said reciprocatory members and movable therewith, and means comprising eccentrics for moving said reciprocatory members with respect to said rotary members to move said shearing elements toward each other.

3. A shearing device comprising a plurality of rotary members between which the material to be cut is passed, reciprocatory members supported by said rotary members and movable with respect thereto, means for guiding said reciprocatory members, shearing elements fixed to said reciprocatory members and movable therewith, slidably mounted heads associated with said reciprocatory members and movable therewith and with respect thereto, and eccentrics cooperable with said heads for imparting motion through same to said reciprocatory members.

4. A shearing device comprising a plurality of rotary members between which the material to be cut is passed, reciprocatory members supported by said rotary members and movable with respect thereto, said reciprocatory members being provided with guideways, guideways formed on said rotary members for guiding said reciprocatory members, shearing elements fixed to said reciprocatory members and movable therewith, heads slidably mounted in said guideways on said reciprocatory members, and eccentrics cooperable with said heads for imparting motion through same to said reciprocatory members.

In testimony that I claim the foregoing I hereunto affix my signature.

STEPHEN T. MORELAND.